UNITED STATES PATENT OFFICE.

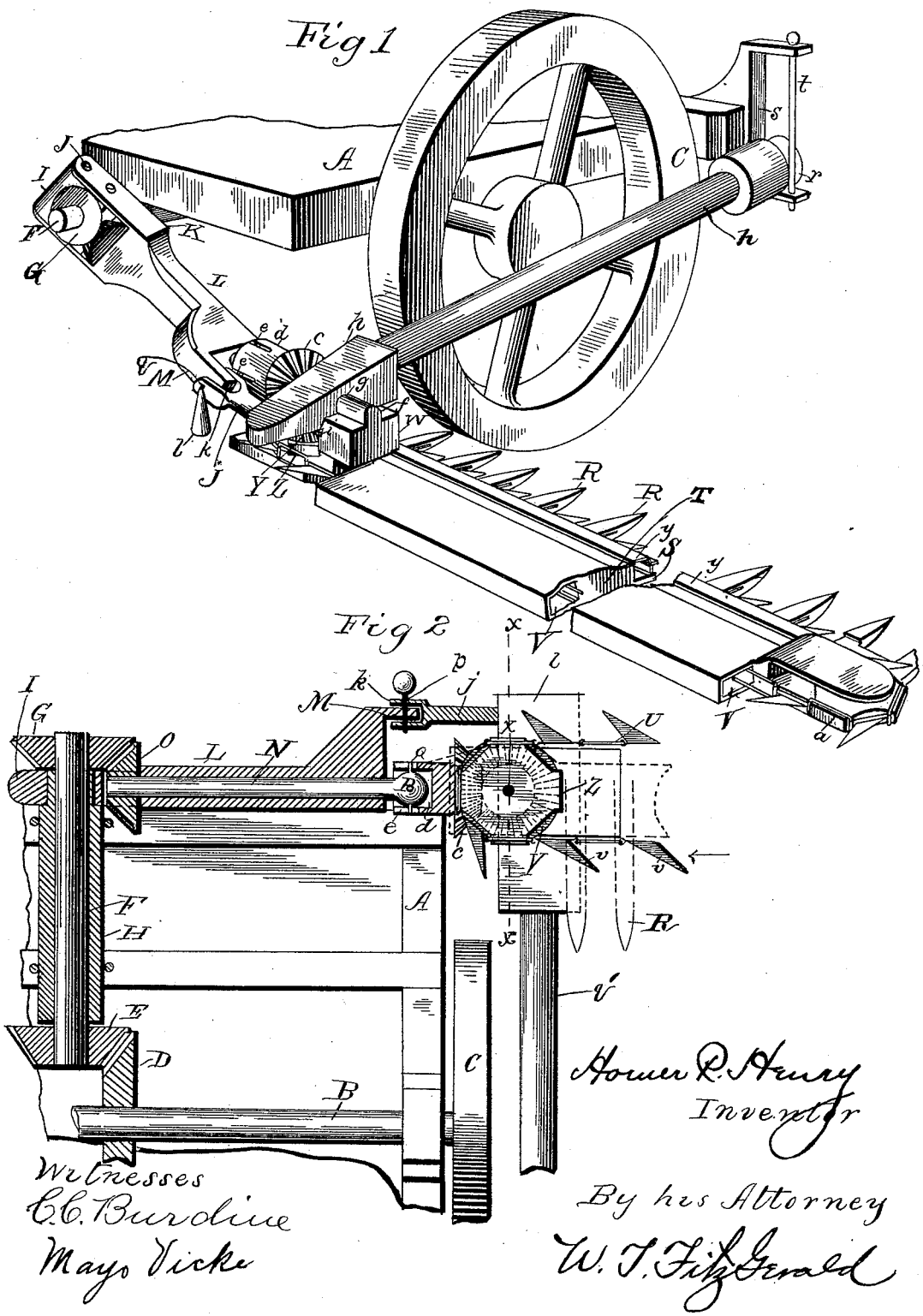

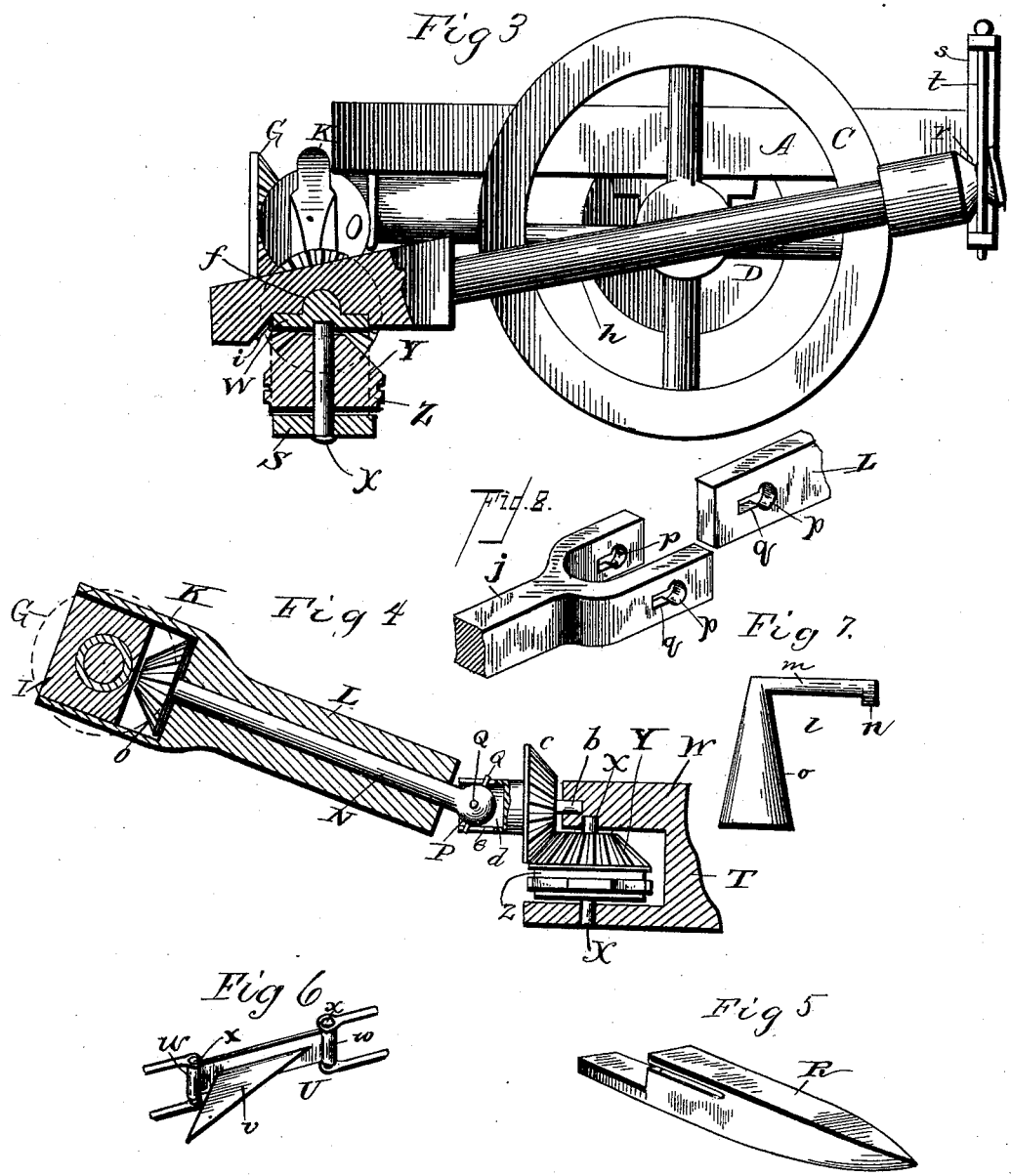

HOMER POWERS HENRY, OF LATHAM, MISSOURI.

HARVESTING-MACHINE.

SPECIFICATION forming part of Letters Patent No. 429,724, dated June 10, 1890.

Application filed September 30, 1889. Serial No. 325,615. (No model.)

*To all whom it may concern:*

Be it known that I, HOMER POWERS HENRY, a citizen of the United States, residing at Latham, in the county of Moniteau and State of Missouri, have invented certain new and useful Improvements in Harvesting-Machines; and I do hereby declare the following to be a full, clear, and exact description of the invention, such as will enable others skilled in the art to which it appertains to make and use the same.

My invention relates to improvements in harvesting-machines; and the invention consists in certain novel features, hereinafter described and claimed.

In the annexed drawings, Figure 1 is a perspective view of a portion of a harvester provided with my improvements. Fig. 2 is a bottom plan view with parts in horizontal section. Fig. 3 is a side view with a part in section on the line $x\ x$ of Fig. 2. Fig. 4 is a detail sectional view of the gearing for transmitting motion to the cutting apparatus. Fig. 5 is a detail perspective of one of the guard-fingers. Fig. 6 is a detail view of one of the knives, and Fig. 7 is a detail view of the locking-pin. Fig. 8 is a detail view to show the passages through which the locking-pin is inserted.

Referring to the drawings by letter, A designates the main frame or carriage provided with the transverse axle B and the supporting and driving wheels C on the ends of the axle. At an intermediate point of the axle I secure thereon the gear-wheel D, and this gear-wheel meshes with a bevel-pinion E, which is secured to the front end of a longitudinally-disposed shaft F, said shaft having a similar bevel-pinion G on its rear end. This shaft F is mounted in a sleeve or extended journal-box H, which is secured to the under side of the platform of the main frame and has its rear end reduced and extended beyond the platform. The rear extended end of the sleeve H is loosely fitted in a bearing-block I, so that the said block may turn freely on the sleeve in a vertical plane. This bearing-block is secured by screws J in a yoke or bifurcation K at the upper end of a journal-box L, which is arranged in rear of and parallel with the rear edge of the platform, the lower end of said journal-box being provided on its rear side with the longitudinal extension M, as shown, which is adapted to be coupled to the drag-bar $q'$. A shaft N is mounted in the journal-box L, and is provided at its upper end with the pinion O, meshing with the pinion G, and at its lower with the ball or spherical enlargement P, having a series of radial pins Q. The guard-fingers R are secured to and project forward from the finger-bar S, and the said finger-bar has a central longitudinal rib or raised portion T on its upper side, around which the endless cutter U moves. In rear of this rib I secure on the finger-bar a housing V, which extends over the returning knives to protect them from injury and prevent the falling grain from catching in them and clogging their action. At the inner end of the finger-bar I provide the bracket W, which rises from the rib T and projects inward therefrom, and in the finger-bar and the said bracket I journal a short vertical shaft X, on which a bevel-pinion Y is secured, the said pinion being provided with an integral sprocket-wheel Z. A similar sprocket-wheel $a$ is mounted on the upper side of the finger-bar, at the outer end of the same, and the endless cutter U passes around and is set in motion by the said sprocket-wheels $a$ and Z. A pintle $b$ projects inward from the bracket W, and a pinion $c$, meshing with the pinion Y, is mounted on said pintle. A socket $d$ is secured to the inner side of the pinion $c$ and is provided with the longitudinal slots $e$ in its wall, as clearly shown. This socket fits over the ball P, and the slots therein receive the pins Q on said ball. The bracket W is provided on its upper side with a longitudinal rib $f$, to provide a bearing or support for the pintle $b$, and this rib fits in a groove $g$ in the under side of the drag-bar $h$, so that the said drag-bar will be made to act positively and directly on the bracket, and thus draw the cutting apparatus over the ground. The rear end of the drag-bar is secured rigidly to the bracket W by a connecting-plate $i$. The drag-bar is further provided at its rear end with the lateral projection $j$, the extremity of which is bifurcated, as shown at $k$, and engages the extremity of the extension M. The extension M and the projection $j$ are loosely secured together by a removable locking-pin

*l*, which consists of the cylindrical body *m*, the lip *n* at one end of said body, and the weighted handle *o* at the opposite end of the same. The aligned perforations *p* in the ends of the extension M and the projections *j* are provided with grooves *q* in their upper sides, and when the pin is being placed in position it is turned so that the lip *n* will engage the grooves *q*, and thus permit the locking-pin to be easily inserted through the perforations. After the pin has passed through the perforations the weighted handle is released and will at once fall, thus turning the pin so that the lip will engage the side of the extension, thus preventing the accidental withdrawal of the pin. The front end of the drag-bar *h* is provided with an annular groove *r* and plays in a yoke forming a part of a bracket *s* on the side of the main frame, at the front end of the same, and a pin *t*, which is removably secured in said yoke, engages the said annular groove to retain the end of the drag-bar in the yoke.

The cutting apparatus consists of an endless chain U, which passes around the sprocket-wheels Z and *a*, as above stated, and has its links engaged by the teeth of said wheels. The links of the chain are alternately open and closed, and the closed links carry the triangular knives *v*, which may be formed integral with the link or formed separately therefrom and secured thereto, as will be readily understood. The closed links are provided at their ends with the perforated lugs *w*, which enter the ends of the open links, and pivot-pins *x* are inserted through the said lugs and the ends of the open links to secure the links together. A shield *y* is secured on the upper side of the rib on the finger-bar and projects over the endless chain to prevent the stubble or dirt from entering the links and clogging the action of the chain. The edge of the shield bears on the knives to hold them to their work and prevent them from buckling.

The construction and arrangement of the several parts of my improved machine being thus made known, the operation and advantages of the same will be readily understood. The machine is drawn over the field in the usual manner, and the motion of the carrying-wheels will be transmitted directly to the cutting apparatus through the gearing shown and described, so as to move the knives in the direction indicated by the arrow in Fig. 2.

It will be observed that in my improved machine all the parts of the operating mechanism are effectually inclosed and protected, so that they will be guarded against injury. The several parts, furthermore, are compactly arranged, so that an economy of room is effected and draft of the machine lightened. It will be particularly noticed that while the cutting apparatus is held positively to its work the several parts are free to move on each other, so that the knives can readily accommodate themselves to any unevenness of the ground.

Having thus described my invention, what I claim, and desire to secure by Letters Patent, is—

1. The combination of the main frame, the sleeve secured thereto, the long journal-box arranged in rear of and parallel with the main frame and having a yoke at its upper end, the bearing-block secured in said yoke and mounted on the sleeve, the shafts journaled in the sleeve and the box and provided with intermeshing pinions, mechanism for rotating said shafts, the finger-bar, the drag-bar connected thereto and having a lateral projection pivoted to the lower end of the long journal-box, the cutting apparatus, and gearing between the same and the shaft in the long journal-box, as set forth.

2. In a mower, the combination of the journal-box having a longitudinal extension, the drag-bar having a lateral projection engaging said extension, the said extension and projection being provided with transverse openings having grooves in one side, and the locking-pin adapted to pass through said openings and consisting of a cylindrical body having a lip at one end and a weighted handle at the other end, as set forth.

In testimony whereof I affix my signature in presence of two witnesses.

HOMER POWERS HENRY.

Witnesses:
ELEAZAR CLAY,
WEBSTER L. CLAY.